(No Model.)
J. W. MIX.
PROBE FOR INSERTING PATCHES IN PNEUMATIC TIRES.
No. 557,213.  Patented Mar. 31, 1896.
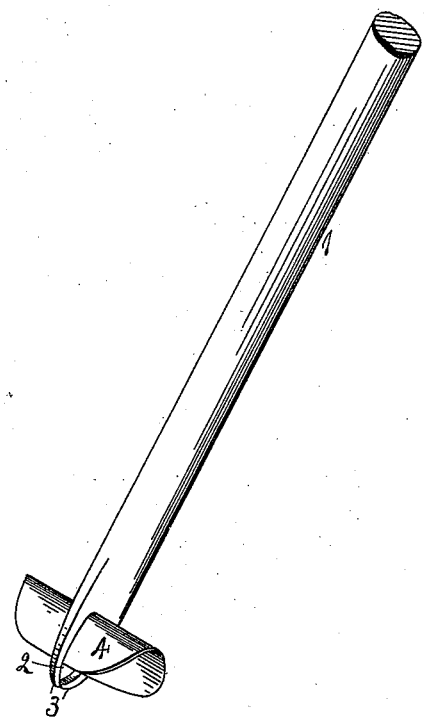
Witnesses:
N. M. Ward
E. Behel
Inventor:
Judd W. Mix
By A. O. Behel
Atty

UNITED STATES PATENT OFFICE.

JUDD W. MIX, OF BYRON, ILLINOIS.

PROBE FOR INSERTING PATCHES IN PNEUMATIC TIRES.

SPECIFICATION forming part of Letters Patent No. 557,213, dated March 31, 1896.

Application filed May 13, 1895. Serial No. 549,113. (No model.)

*To all whom it may concern:*

Be it known that I, JUDD W. MIX, a citizen of the United States, residing at Byron, in the county of Ogle and State of Illinois, have invented certain new and useful Improvements in Probes for Inserting Patches in Pneumatic Tires, of which the following is a specification.

The object of this invention is to construct a device, which I have termed a "probe," for holding a patch, and with which it is inserted in an opening in a pneumatic tire, and by which the patch is placed in proper position on the inside of the tire and the probe removed, leaving the patch over the opening in the tire.

In the accompanying drawing I have shown an isometrical representation of my improved probe.

In the employment of pneumatic tires consisting of a single tube the only manner of closing a puncture has been by the employment of plugs having a flanged head and a long tapering shank. The head is forced through the opening in the tire, allowing its flanged head to expand, which is drawn up against the inner face of the tire and held in place by cement previously applied to the head, after which the shank is cut off flush with the outer surface of the tire. This process required that the opening in the tire be considerably enlarged by cutting away the material composing the tire, and it has been found that the plug would become detached and creep inward, requiring a larger plug to again close the opening.

My invention is designed to insert a patch—that is, a piece of sheet-rubber—into an opening in the tire, and after placing it in proper position the instrument is removed. My probe in this instance has a shank 1 of cylindrical form, one end being flattened. The flattened portion has an eye 2, the walls 3 of the eye tapering toward the end of the probe, forming spring-jaws.

The manner of using the probe will now be explained. The patch 4 of sheet-rubber is doubled and inserted in the eye of the probe, so that about one-half its length will extend each side of the eye. The outer surface of the patch is covered with liquid cement. The patch is then forced through the opening in the tire until it is wholly within the tire, and by drawing outward upon the probe the center or doubled portion of the patch will be brought in contact with the inner surface of the tire across the opening, which will cause it to adhere its entire length to the inner face of the tire. The probe is then withdrawn from the opening, the spring-jaws yielding sufficiently to draw out over the patch, and when the patch is free it will flatten out against the inner face of the tire, when the pressure of the fingers will firmly seat the patch in position, and as soon as the cement sets the tire is ready to be inflated and used.

My probe is only intended to insert the patch within the tire and cause it to adhere sufficiently to the inside of the tire to allow the withdrawal of the probe and so place the patch that it will cover the opening.

I claim as my invention—

As an article of manufacture a probe for inserting patches in pneumatic tires comprising a shank having a pair of spring-jaws at one end whose extreme ends are in proximity to each other and whose inner edges are separated from each other sufficiently to hold the patch between them without creasing it, substantially as set forth.

JUDD W. MIX.

Witnesses:
    A. O. BEHEL,
    E. BEHEL.